US005804031A

United States Patent [19] | [11] Patent Number: 5,804,031
Cavanna | [45] Date of Patent: Sep. 8, 1998

[54] DEVICE FOR APPLYING TEAR-STRIPS

[75] Inventor: Mario Cavanna, Romagnano Sesia, Italy

[73] Assignee: Cavanna S.p.A., Italy

[21] Appl. No.: 939,609

[22] Filed: Sep. 29, 1997

[30] Foreign Application Priority Data

Oct. 3, 1996 [IT] Italy .................................. T096A0806

[51] Int. Cl.[6] ........................................ B32B 31/00

[52] U.S. Cl. .......................... 156/518; 156/520; 156/530; 156/552; 156/553

[58] Field of Search ..................................... 156/510, 516, 156/517, 518, 519, 520, 530, 552, 553

[56] References Cited

U.S. PATENT DOCUMENTS

| | | | |
|---|---|---|---|
| 3,298,891 | 1/1967 | Beck | 156/519 |
| 4,045,275 | 8/1977 | Stohlquiest et al. | 156/521 |
| 4,196,035 | 4/1980 | Reil | 156/361 |
| 4,409,062 | 10/1983 | Conti | 156/518 |
| 4,642,150 | 2/1987 | Stemmler | 156/164 |
| 4,765,118 | 8/1988 | Akutsu et al. | 53/133 |
| 5,200,020 | 4/1993 | Collins et al. | 156/520 |

FOREIGN PATENT DOCUMENTS

| | | |
|---|---|---|
| 1011722 | 12/1965 | United Kingdom . |
| 1558998 | 1/1980 | United Kingdom . |

*Primary Examiner*—James Sells
*Attorney, Agent, or Firm*—Trask, Britt & Rossa

[57] ABSTRACT

The tear-strips are formed by transverse cutting of a sheet material by a cutter with a rotary blade, of which the blade cooperates with counter-blades carried by a rotary member. Once formed, each tear-strip is held on the respective counter-blade, for example, by means of a vacuum, so that it can be transferred to a sheet of wrapping material. The tear-strip is applied to the wrapping material transversely by the combined action of the counter-blade and of a striker block carried by a further rotary member disposed on the opposite side of the sheet material. The sheet material can thus advance at a constant speed throughout the process of applying the tear-strips. The preferred use is for automatic packaging machines for products such as food products.

24 Claims, 2 Drawing Sheets

DEVICE FOR APPLYING TEAR-STRIPS

DESCRIPTION

Figure 1:
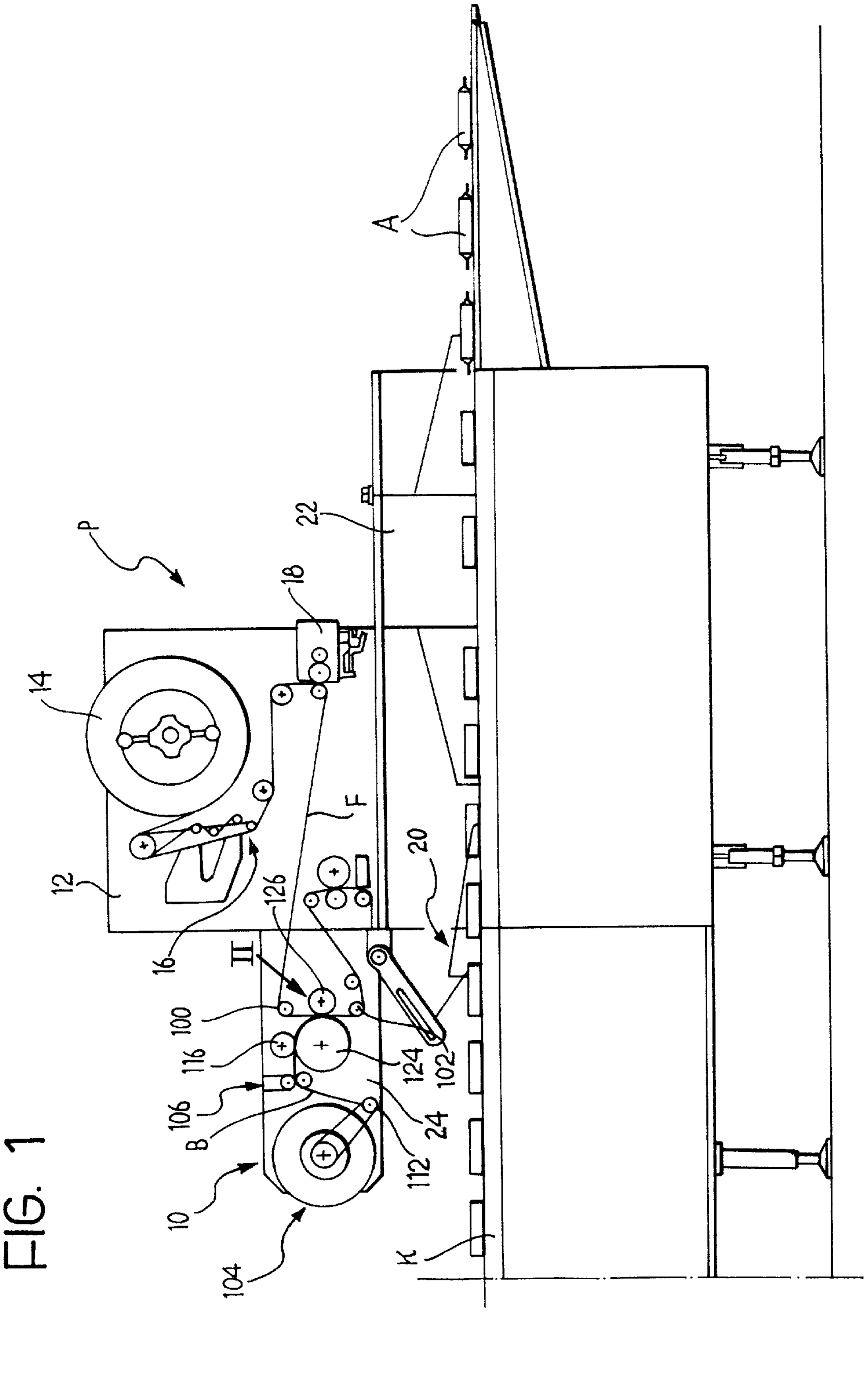

The present invention relates to devices for applying tear-strips, in particular, to a ribbon of sheet material which is to form wrappers for the packaging of products such as food or confectionery products.

Specifically, the present invention relates to a device according to the preamble to claim 1 known, for example, from IT-B-1 041 468 which corresponds to GB-A-1 558 998. A generally similar device is known, for example, from U.S. Pat. No. 3,298,891.

These prior documents describe in general terms problems which arise in the production of a device for applying so-called tear-strips by arranging them transversely relative to the direction of advance of the wrapping material. In particular, a need has been noted in the past to avoid the application of transverse tear-strips leading to a requirement for the wrapping material to be advanced intermittently, at least locally; this selection is in fact incompatible with the very fast speeds of advance which the material is intended to reach in recently-produced packaging machines, particularly in those of the type known as "flow-pack", "form-fill-seal", or "ffs" packaging machines.

The solutions described in the documents cited above provide for the tear-strips to be formed by transverse cutting of a further ribbon of sheet material. The individual tear-strip is then transferred to the sheet of wrapping material by means of a rotary member which also acts as a striker element during the cutting of the individual tear-strips and/or as an applicator member, heated if necessary, for applying the tear-strips to the wrapping material.

However, the solutions described in the prior documents cited above are unsatisfactory for various reasons.

For example, in the solution known from IT-B-1 041 468 and from GB-A-1 558 998 the aforementioned rotary member is configured substantially as a roller with two transfer elements mounted in diametrally-opposed positions. In use, one of the transfer elements receives a tear-strip just formed as a result of a cutting action performed by a cutter located in a fixed position relative to the structure of the device. At the same time, the diametrally-opposed transfer element cooperates with the sheet of wrapping material in order to deposit a tear-strip formed in a previous cutting operation. This gives rise to an intrinsic limitation since:

- on the one hand, it is desirable for the transfer element cooperating at a particular time with the cutter, which is in a fixed position, to move as slowly as possible to facilitate the cutting operation, and
- on the other hand, it is desirable to arrange for the diametrally-opposed transfer element to move at a speed equal to the speed of advance of the sheet of wrapping material.

It is quite clear that the conditions mentioned above can be ensured satisfactorily only if the speed of advance of the sheet material is slow.

In the solution known from U.S. Pat. No. 3,298,891, the rotary member is constituted by a turret or carousel structure for cooperating with a fixed cutting blade. The geometry of the rotary member in question is such that the alignment of one of the transfer elements with the blade which cuts a tear-strip does not correspond to the alignment of another transfer element with the sheet wrapping material. However, the rotary member is arranged to be moved intermittently or in steps (for example, corresponding to an angular travel through 90° since the rotary element has four transfer members) which are equal to a fraction of a cycle and is then left stationary until the cycle is completed. In this case also the conflict between the need to cut the tear-strips in practically stationary conditions and the need to apply the tear-strips to the sheet wrapping material whilst they are moving at a speed equal to the speed of advance of the material, which is to be kept constant, is not overcome.

The object of the present invention is to provide a device of the type specified above in which the problems described above are overcome.

According to the present invention, this object is achieved by means of a device having the specific characteristics recited in the following claims.

Figure 2:
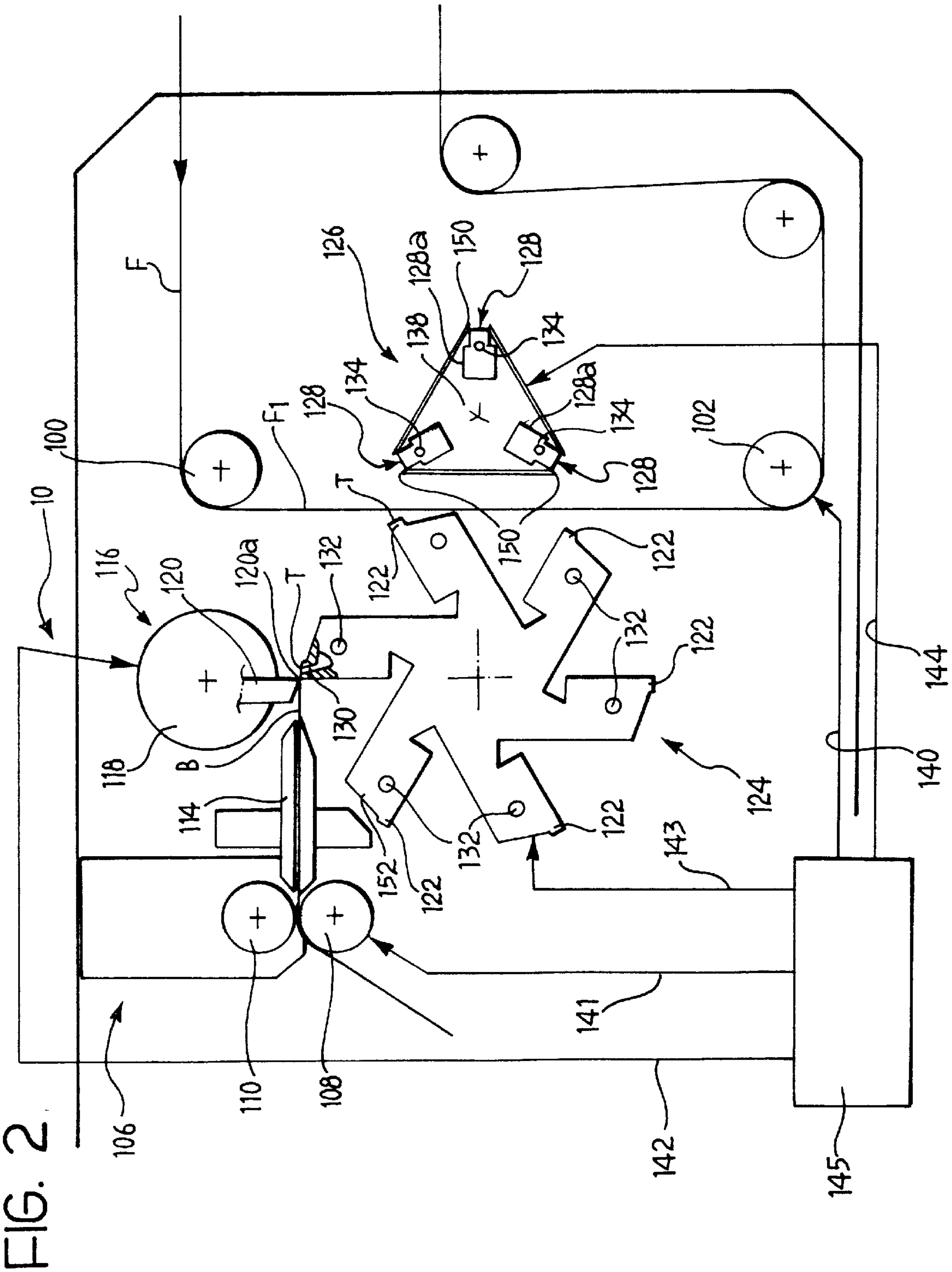

The invention will now be described, purely by way of non-limiting example, with reference to the appended drawings, in which:

FIG. 1 is a general side elevational view of a packaging machine on which a device according to the invention is mounted, and FIG. 2 corresponds essentially to a side elevational view, partially sectioned for clarity, of the portion of FIG. 1 indicated by the arrow 11.

In FIG. 1, a packaging machine, generally indicated P, is constituted, for example, by a machine of the type generally known as a "flow-pack" or "ffs" machine. Packaging machines of this type are widely known in the art; their characteristics do not therefore need to be described in detail herein and, moreover, are not relevant for the purposes of an understanding of the invention.

For this purpose, it will suffice to note that the machine P is intended to act on a row of articles A (constituted, for example, by food products such as confectionery products: bars of chocolate, groups of biscuits, snacks, etc.) which advance—from left to right, as seen in FIG. 2—on a conveyor belt K supported on an elongate table which can also serve as a base structure for part or of all of the device according to the invention.

For this purpose, above and generally astride the conveyor belt K there is a fixed framework 12 which, in use, supports a roll 14 of a ribbon of sheet material F which is to form wrappers for packaging the articles A in the machine P.

The sheet material may be constituted, for example, by heat-sealable plastics material or aluminium, possibly of the type which is coated with plastics material, thus giving rise to a so-called "combined" wrapper. According to widely-known criteria, the material F is drawn from the roll 14 and passed through a set of drive and tensioning rollers, generally indicated 16, and may then be subjected to a stamping operation (for example, for stamping a date indicative of the packaging date) in a printing device 18.

The ribbon then reaches a so-called shaper 20. Here the ribbon of sheet material F is closed onto itself so as to form a tubular semi-finished wrapper in which the articles A are inserted in a precisely regulated ("timed") sequence and then advances towards a sealing and cutting unit 22 (of known type comprising, for example, two sets of contra-rotating jaws) where the semi-finished tubular wrapper is squashed, sealed and cut forming individual wrappers closed around the articles A (in this connection, see the far right-hand portion of FIG. 1). Naturally, each wrapper or package may also include several articles and, for this purpose, the machine P may comprise devices which group the articles A in the input flow so as to place close together the articles which are to be housed inside a single wrapper or package. All of this takes place, as stated, according to known criteria which do not need to be described herein.

A device 10 for applying so-called transverse tear-strips to the sheet material F is disposed on the path followed by the ribbon between the roll 14 and the shaping device 20, and is mounted, for example, on a bracket-like structure 24 projecting from the framework 12 in a position generally upstream of the shaper 20. The tear-strips are intended to enable the wrappers or packages formed around the articles A to be torn regularly and neatly by the user when he wishes to eat, or in general, to use, the articles A.

It can be seen from FIG. 2, which shows the structure of the device 10 in greater detail, that, according to a preferred but not essential solution, the device operates on the sheet material F in the region of a portion F1 thereof which extends substantially vertically, moving downwards from above from an upper deflection roller 100 towards a lower deflection roller 102 at a given speed which should be kept as constant as possible since it is linked with the speed of operation of the packaging machine P.

Essentially, the device 10 comprises the following elements:

- a source 104 for supplying an additional ribbon of sheet material B which is to be cut transversely relative to its direction of advance so as to form the individual tear-strips, indicated T, to be applied to the sheet material F; the source may be constituted, in the most usual embodiment, by a support for holding a roll of the material B (this is usually a heat-sealable plastics material or a sheet to which a so-called "cold" adhesive is applied on the face which is to face the material F);
- a withdrawal unit 106 constituted, for example, by a pair of rollers comprising a motor-driven roller 108 and an opposed pressure roller 110, possibly associated with a tensioning roller 112 (FIG. 1) and a guide member 114, for example, with a slot, the function of which is the stepped unwinding of the sheet material B which is on the source 104, the size of each step being equal to the width of the tear-strips to be formed (for example, 2–5 mm);
- a cutting unit 116 comprising a rotary cutter 118 having at least one rotary or orbital blade 120 with a cutting edge 120*a* extending along a generatrix of a theoretical cylindrical surface the principal axis of which corresponds to the axis of rotation of the rotary cutter; the cutting unit 116 can receive the sheet material B coming from the source 104 and from the unit 106, cutting it into pieces of precisely the desired length, corresponding to the width of the tear-strip T;
- a rotary member 124 having a generally carousel-like structure with a plurality of spokes (six in the embodiment illustrated) which carry, at their free ends, respective counter-blades 122 for cooperating with the blades 120 of the cutting unit 116; and
- a further rotary member 126 situated on the opposite side of the portion F1 of the sheet material F to the rotary member 124; the rotary member 126 also has a generally carousel-like structure with a plurality of spokes, that is, three spokes in the embodiment shown, each carrying, at its free end, a respective striker element or block 128 for cooperating with the counter blades 122 of the element 124 in accordance with criteria which will be described further below.

In general, all of the members described above move about parallel axes generally oriented horizontally with reference to the overall geometry of the machine P shown in FIG. 1.

The device 10 according to the invention operates essentially as follows.

The ribbon of sheet wrapping material F is advanced at a constant speed determined by the speed of operation of the machine P: in other words, the wrapping material F is unwound by the respective drive devices as if the machine P were not configured for the application of the tear-strips.

The members which draw the additional sheet B from which the tear-strips T are formed are controlled, particularly with regard to the withdrawal unit 106, so as to unwind the material B in steps, the size of each step being equal to the width of the tear-strip T to be formed.

The ribbon B is cut and the tear-strips T are consequently formed as a result of the interaction of the rotary blade 120 of the cutter 118 (which rotates anticlockwise as seen in FIG. 2) with the counter-blades 122 carried by the rotary member 124 which rotates clockwise, again as seen in FIG. 2. The cutting action is thus achieved owing to the fact that, in the (first) zone or region of the device 10 in which the blade 120 and the counter-blade 122 involved in the time in question interact, this region being situated directly at the output of the guide member 114, the blade 120 moves with a (peripheral) velocity at least slightly greater than the peripheral velocity imparted to the counter-blades 122 in the region of interaction. The shearing action between the blade 120 and each counter-blade 122 therefore takes place because, at least in the region of interaction at the output of the guide element 114, the blade 120 is moving faster than the counter-blade 122 and, in any case, owing to a movement in the same direction as the supply movement of the further sheet material B from the respective supply means 104 and 106. As will be appreciated from an observation of FIG. 2, the blade 120 and the counter-blades 122 preferably have complementary, scissor-like profiles in the sense that the blade 120 is arranged with its cutting edge 120*a* situated radially farther out than the adjacent (and following) portions of the blade 120. The counter-blades 122 are of a precisely symmetrical and complementary shape.

The cutting of the ribbon B thus takes place dynamically and the tear-strips T (two of these are shown schematically in FIG. 2) are transferred from the cutting unit 116 towards the sheet of wrapping material F actually by the respective counter-blade 122, on which the tear-strip T is restrained by a vacuum (again by known criteria) by virtue of the presence, in the radially outer regions of the counter-blades 122, of suction ducts 130 (only one of these is shown in FIG. 2) connected to a vacuum (sub-atmospheric pressure) source by means of respective ducts which extend through the body of the rotary member 124.

The tear-strips T are then transferred from the cutting unit 116 towards the sheet of wrapping material F and are applied to the wrapping material F by a precisely synchronized movement, that is, in a manner such that the tangential velocity of the counter-blade 122 is practically identical to the (linear) velocity of the portion F1 of the sheet material F. This takes place at least in the (second) region of the device 10 in which each counter-blade 122 carrying a tear-strip T applied thereto is brought into contact with the wrapping material F in order to deposit the strip T in question thereon.

It is clear from the foregoing that the solution according to the invention permits substantially continuous operation, particularly with regard to the rotary element 124 which acts both as a component of the cutting unit 116 (since it carries the counter-blades 122) and as a transfer element which transfers the tear-strips T from the cutting unit 116 to the sheet of wrapping material F using the counter-blades 122 as elements for holding the tear-strips T.

It will be appreciated, in particular, that the member 124 can be rotated at an almost constant speed selected so as to impart to the counter-blades 122 a tangential velocity equal to the linear velocity of advance of the sheet material F or, in a currently-preferred embodiment, by arranging for the counter-blades 122 to cooperate with the rotary blade 120 at a tangential velocity slightly less than the speed of advance of the sheet material F; in particular, this enables the respective counter-blades 122 to hold the tear-strips T just formed more precisely and securely. The rate of rotation of the member 124 and hence the tangential velocity of the counter-blade 122 concerned at any particular time can then be increased so as to reach a tangential-velocity value corresponding to the speed of advance of the sheet material F. A constant rate of rotation corresponding to the speed of advance of the sheet material F is however possible. In any case, even if a certain slowing in the region of the cutting unit 116 is provided for, this phenomenon is, however, restricted to a limited modulation of the rate of rotation of the member 124 which is quite different from an intermittent or stepped movement of the type which was necessary in the solutions of the prior art.

This also applies to the rotary cutter 118 and the blade 120, the rate of rotation of which can in any case be controlled (possibly with a swing so as to achieve the maximum value in the region in which the cutting action takes place) so as in any case to ensure the speed difference between the cutting edge 120*a* of the blade 120 and the counter-blade 122 at the corresponding moment, so as to achieve the desired cutting effect.

It can also be seen from FIG. 2 that—in the embodiment illustrated—the rotary member 124 has six spokes each carrying a respective counter-blade 122, whereas the further rotary member 126 carries only three spokes, each having a respective striker block 128 at its free end. The term "striker block" is intended to indicate that each of these portions of the further rotary element 126 is intended to cooperate with a respective counter-blade 122 of the member 124 during the rotation of the member 126 (which takes place anticlockwise as seen in FIG. 2). This means that, each time a counter-blade 122 deposits a respective tear-strip T on the sheet material F, acting on one face thereof (the face situated on the left as seen in FIG. 2), the other face of the sheet F (the right-hand face in FIG. 2) is in contact with and bearing against a respective striker block 128 of the member 126.

In these conditions, the tear-strip T and the region of the portion F1 of the sheet material F to which it is applied, are gripped between the counter-blade 122 acting as an applicator member and a respective striker block 128, acting as an striker element.

The elements performing this gripping action preferably but not necessarily carry respective associated heating means, typically constituted by resistors 132, 134. The function of these heating elements is to transfer heat to the sheet F and/or to the tear-strips T by supplying heat to the counter-blade/applicator 122 and/or to the striker block 128 locally so as to bring about and/or at least facilitate the application of the tear-strip T to the sheet material F.

This connection may take place either by thermal fusion of the materials involved or as a result of gluing achieved by virtue of the presence of an adhesive material, usually on the face of the tear-strips T which are to face the sheet F.

This is usually a so-called "cold" adhesive, this term meaning a material the adhesive properties of which are developed and/or enhanced as a result of heating to a moderate temperature (for example, of the order of 80°–90°).

For clarity, it should, however, be pointed out that, even when they are provided, it is not essential to have heating means such as the resistors 132, 134 for both of the cooperating elements, that is, for the counter-blades 122 of the member 124 and for the striker blocks 128 of the member 126.

According to specific requirements of use, particularly of the methods adopted for the connection of the tear-strips T to the sheet F, and/or to the nature of any adhesive used, the heating means could be present solely on the rotary element 124 or solely on the rotary element 126. Moreover, in view of the availability of materials which do not require the application of heat to ensure the tear-strips T are held firmly on the sheet material F, the heating means 132 and 134 may be eliminated.

Again from an observation of FIG. 2, it can be noted that the number of spokes, and hence of striker blocks 128, of the member 126 differs (being equal to three in the embodiment shown) from the number of spokes, and hence of counter-blades 122, of the rotary member 124. The respective diameters shown are also different.

Although this selection is considered preferable (for example, to facilitate selective removal of the counter-blades 122), it is in no way essential. The speed and phases of rotation may be varied according to the number of spokes present on each of the members 124, 126 and to the radii of rotation of the respective ends which carry the counter-blades 122 and the striker blocks 128, in a manner such as to ensure that a striker block 128 is in any case always precisely aligned with a counter-blade 122 which is applying a respective tear-strip T to the sheet material F.

Again in FIG. 2, it can be seen that the striker blocks 128 are mounted on the body of the member 126 in respective radial seats 128*a*. These seats provide the striker blocks 128 with a certain freedom of movement in a radial direction relative to the member 126. This enables each striker block 128 to withdraw slightly inwards relative to the rotary member 126, overcoming the reaction of a respective spring 138 (only one of these springs has been shown in FIG. 2, for reasons of clarity). The gripping of the sheet material F and of the tear-strip T being applied thereto at a particular time, which takes place between the counter-blade 122 and the respective striker block 128, can be achieved in the form of a resiliently-loaded grip ensured by the ability of the striker block 128 to yield resiliently.

It will be appreciated that the geometry of the member 124 (six spokes with an angular spacing of 60° around the axis of rotation of the member 124) is such that, since the region in which the cutting of the tear-strips T takes place and the region in which they are applied to the sheet material F are spaced apart angularly (again with reference to the horizontal axis of rotation of the member 124) by 90°, when a counter-blade 122 is engaged—in the first region—in the cutting of a tear-strip T, no other counter-blade 122 (particularly that which is immediately downstream in the direction of movement of the member 124) is engaged—in the second region—in the transfer of a respective tear-strip to the sheet material F. Conversely, whilst the latter counter-blade is transferring the respective tear-strip T to the sheet material F—in the second region, no other counter-blade (especially that which is immediately upstream in the direction of rotation of the member 124) is engaged in the cutting of a new tear-strip T—in the first region. This geometry therefore allows for any alteration of the rate of rotation of the member 124 in order to achieve the aforementioned modulation of the speed so as to be able to optimize the tangential velocity of each counter-blade 122 locally when it is engaged in the cutting of a new tear-strip T and when it is engaged in the transfer of a tear-strip T to the sheet material F.

Reference numerals 140 to 144 identify—intentionally symbolically—the control functions of the various movable members included in and/or associated with the device 10, that is:

the rollers 100, 102—or, in general, the rollers 16 for driving the sheet wrapping material F (line 140), the unit 106 for the stepped withdrawal of the sheet material B from which the tear-strips T are formed (line 141), the rotary cutter 118 (line 142), the rotary member 124 (line 143), and the further rotary member 126 (line 144).

The aforesaid control functions can be implemented (by wholly known criteria) so as to achieve independent and coordinated control of the movement of all of the members concerned. This may take place, for example, under the surveillance of a general control unit 145 constituted, for example, by an electronic processor or by a so-called PLC.

It is stressed that the representation given herein is purely symbolic since one or more of the drive functions in question may be implemented in an integrated and connected manner for several functions rather than with the use of independent motors each receiving a respective control signal from the unit 145. For example, the drive function for the unwinding of the ribbon B (unit 106), for the rotary cutter 118, and for the applicator unit (member 124 and/or 128) may be performed by a single drive unit, the various elements concerned being connected by means of mechanical transmissions.

With regard to the selection of the motors for driving the various members shown, the use of brushless motors which combine excellent torque characteristics with the ability to be subjected to very precise control is currently preferred.

The solution described can advantageously be developed in various ways.

For example, beside each striker block 128, there may be a pair of radial blades 150 extending only at one end (axially) of the rotary member 126. The function of these blades is to form one or two cuts on opposite sides of the tear-strip T in the region of one of the side edges of the ribbon of sheet material F, the cut or cuts forming two notches disposed beside the free end of the tear-strip T in the package formed in the machine P so as to facilitate gripping of the free end in order to exert a pull on the tear-strip.

The counter-blades 122 are preferably but not necessarily mounted on the member 124 so as to be at least partially selectively removable as indicated schematically by the presence of clamping members such as, for example, screws 152 (only one of these is shown in FIG. 2). The selection of this construction allows the rotary member 124 to be re-configured, for example, by the removal of one in two of the counter-blades 122 in alternating sequence, leaving only three counter-blades 122 spaced angularly by 120° on the member 124. It is thus possible to apply tear-strips T farther apart (for example, twice as far) than when they are applied with the use of six counter-blades 122, whilst the operating criteria of the device remain substantially unchanged. This is achieved without the need for appreciable modification of the operating speeds and in particular of the rates of rotation of the various movable members concerned.

The operation of the device 10 can easily be made subservient to a spatial synchronization datum corresponding to the presence, on the sheet material F, of wording or printed matter of another type which identifies precisely each package to be formed in the machine P. It is thus possible to locate each tear-strip T exactly in a precisely-determined position relative to each package or wrapper, for example, close to one of its ends.

Naturally, the principle of the invention remaining the same, the details of construction and forms of embodiment may be varied widely with respect to those described and illustrated, without thereby departing from the scope of the present invention. This applies particularly but not exclusively to the following elements/characteristics:

the application of the tear-strips T to the sheet material F, which may also be performed by other means, for example, by ultrasound welding, the construction of the rotary members such as, for example, the members 124 and 126, which could be replaced, for example, by movable band or belt elements, and the cutting unit 116 which, whilst retaining its basic characteristic as a dynamic cutting element, could be formed with different technology, possibly without contact, (for example, with the use of laser-beam cutting).

What is claimed is:

1. A device for applying, to a ribbon of sheet wrapping material moving at a given speed, tear-strips oriented transverse the direction of advance of the ribbon, the device comprising:

guide means defining a path of advance of the ribbon through the device, supply means for supplying, in use, a further sheet material for forming the tear-strips, cutting means for cutting the further sheet material so as to form the tear-strips, a movable transfer member acting between a first region facing the cutting means and a second region facing the path of advance defined by the guide means, the movable member acting on the tear-strips in use in order to pick them up from the cutting means in the first region and then to apply them to the ribbon of sheet wrapping material in the second region, the improvement wherein:

the cutting means comprise cutting elements which can cut the further sheet material forming the tear-strips as a result of a movement in the direction in which the further sheet material is supplied by the supply means, the movable member comprises a plurality of elements for holding the tear-strips, the holding elements being movable continuously and being able to adopt, at least in the second region, a speed of advance substantially equal to the given speed of the ribbon of sheet wrapping material, and the elements for holding for the tear-strips are disposed on the movable member in a manner such that, when one of the holding elements is in one of the first and second regions, no other holding element is in the other of the first and second regions.

2. The device according to claim 1, wherein the supply means comprise at least one motor-driven movable member which acts on the further sheet material in use and can be advanced in steps, the size of each step identifying the width of the tear-strip.

3. The device according to claim 1, wherein the supply means are associated with a guide element for imparting to the further sheet material a path of advance directed towards the cutting means.

4. The device according to claim 1, wherein the cutting means comprise a rotary cutter having at least one rotary blade which can perform an orbital movement having a portion extending through the first region in the area of the supply means, the rotary blade moving, in this first region, in the direction in which the further sheet material is supplied by the supply means.

5. The device according to claim 4, wherein at least one counter-blade is associated with the rotary blade and, at least in the first region, moves in the same direction as the rotary blade at a different speed from that of the rotary blade, the difference between the speeds of the rotary blade and of the at least one counter-blade bringing about cutting of the further sheet material and consequent formation of the tear-strips.

6. The device according to claim 5, wherein the at least one counter-blade is carried by the movable member.

7. The device according to claim 6, comprising a plurality of the said counter-blades constituted by the elements for holding the tear-strips provided on the movable member.

8. The device according to claim 1, wherein the movable member has a generally carousel-like structure rotatable about a respective rotation axis with a plurality of spokes each of which carries, at its free end, one of the elements for holding the tear-strips.

9. The device according to claim 1, wherein the elements for holding the tear-strips are distributed uniformly on the movable member.

10. The device according to claim 1, wherein the elements for holding the tear-strips carry associated restraining means for gripping and holding the tear-strips on the movable member until the tear-strips are transferred to the ribbon of sheet wrapping material.

11. The device according to claim 10, wherein the restraining means comprise suction means so that the tear-strips are restrained on the elements for holding the tear-strips owing to a pressure gradient.

12. The device according to claim 1, wherein heating means are associated with the elements for holding the tear-strips and can be activated in order to bring about a transfer of heat towards the tear-strips, at least in the second region.

13. The device according to claim 1, wherein at least some of the elements for holding the tear-strips are mounted on the movable member so as to be selectively removable, so that the distance separating adjacent holding elements is variable selectively as a result of the selective removal of at least some of the holding elements from the movable member.

14. The device according to claim 8, wherein the elements for holding the tear-strips are mounted on the movable member with a first angular spacing relative to the axis of rotation of the movable member, and wherein the first and second regions are located with a second angular spacing, different from the first given angular spacing, relative to the said axis.

15. The device according to claim 14, wherein the second angular spacing is of the order of about 90°.

16. The device according to claim 8, wherein the holding elements are arranged on the movable member with an angular spacing of about 60°.

17. The device according to claim 1, further comprising, on the opposite side of the path of advance defined by the guide means to the movable member, a further movable member provided with at least one striker block which can cooperate with the elements for holding the tear-strips in the second region so as to exert a gripping action on the tear-strips and on the ribbon of sheet wrapping material to which the tear-strips are applied.

18. The device according to claim 17, wherein the further movable member comprises a plurality of the said striker blocks.

19. The device according to claim 18, wherein the movable member comprises a number of striker blocks which differs from the number of elements for holding the tear-strips present on the movable member.

20. The device according to claim 8, further comprising, on the opposite side of the path of advance defined by the guide means to the movable member, a further movable member provided with at least one striker block which can cooperate with the elements for holding the tear-strips in the second region so as to exert a gripping action on the tear-strips and on the ribbon of sheet wrapping material to which the tear-strips are applied and wherein the further movable member also has a carousel-like structure.

21. The device according to claim 20, wherein the further movable member has a diameter which differs from the diameter of the movable member.

22. The device according to claim 17, wherein the at least one striker block is mounted on the further movable member in a resiliently yielding manner so that the gripping action on the tear-strips and on the ribbon of sheet wrapping material is exerted as a result of a resilient pressure.

23. The device according to claim 15, wherein respective heating means are associated with the at least one striker block for bringing about a transfer of heat towards the ribbon of sheet wrapping material, at least in the second region.

24. The device according to claim 17, wherein further cutting means are associated with the at least one striker block for selectively cutting the ribbon of sheet wrapping material in the region of one of its longitudinal edges adjacent the tear-strips applied to the ribbon.

* * * * *